United States Patent
Marand et al.

(10) Patent No.: US 7,109,140 B2
(45) Date of Patent: Sep. 19, 2006

(54) MIXED MATRIX MEMBRANES

(75) Inventors: Eva Marand, Blacksburg, VA (US); Todd W. Pechar, Blacksburg, VA (US); Michael Tsapatsis, Minneapolis, MN (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 0 days.

(21) Appl. No.: 10/410,599

(22) Filed: Apr. 10, 2003

(65) Prior Publication Data

US 2003/0220188 A1    Nov. 27, 2003

(51) Int. Cl.
    *B01J 20/28*    (2006.01)
(52) U.S. Cl. .............. 502/4; 502/64; 502/77
(58) Field of Classification Search ............ 502/4, 502/60, 64, 71, 77
See application file for complete search history.

(56) References Cited

U.S. PATENT DOCUMENTS

| | | | |
|---|---|---|---|
| 6,159,542 A * | 12/2000 | Kondo et al. ............... | 427/245 |
| 6,248,682 B1 * | 6/2001 | Thompson et al. ........... | 502/4 |
| 6,387,269 B1 * | 5/2002 | Eltner et al. ................ | 210/640 |
| 6,500,233 B1 * | 12/2002 | Miller et al. ................ | 95/50 |
| 6,536,604 B1 * | 3/2003 | Brinker et al. .............. | 210/490 |
| 2003/0089227 A1 * | 5/2003 | Hasse et al. ................ | 95/45 |
| 2004/0062909 A1 * | 4/2004 | Tsapatsis et al. ........... | 428/131 |

* cited by examiner

*Primary Examiner*—Jonathan Johnson
(74) *Attorney, Agent, or Firm*—Whitham, Curtis, Christofferson & Cook, PC

(57) ABSTRACT

Mixed matrix membranes are prepared from zeolites and polymers, such as polyimides, in a void free fashion where either no voids or voids of less than several Angstroms are present at the interface of the polymer and the zeolite by bonding (hydrogen, ionic, or covalent) functional groups on the zeolite with functional groups on the polymer. The mixed matrix membranes may be cast or formed by ISAM processes, and may be present on a variety of supports including hollow fibers.

25 Claims, 4 Drawing Sheets

MIXED MATRIX MEMBRANES

BACKGROUND OF THE INVENTION

1. Field of the Invention

The present invention generally relates to membrane materials and systems for selective removal of specified gases and, more particularly, to a gas separation membrane which employs a zeolite material.

2. Description of the Prior Art

Membrane separations represent a growing technological area with potentially high economic reward, due to low energy requirements and facile scale-up of membrane modular design. Advances in membrane technology, especially in novel membrane materials, will make this technology even more competitive with traditional, high-energy intensive and costly processes such as low temperature distillation and adsorption. In particular, there is need for large-scale gas separation membrane systems, which could handle processes such as nitrogen enrichment, oxygen enrichment, hydrogen recovery, acid gas ($CO_2$, $H_2S$) removal from natural gas and dehydration of air and natural gas, as well as various hydrocarbon separations. Materials employed in these applications must have durability, productivity and high separation performance if they are to be economically viable. Currently, polymers and certain inorganic membranes are the only candidates.

While inorganic membranes have permselectivities that are five times to ten times higher than traditional polymeric materials and moreover are more stable in aggressive feeds, they are not economically feasible for large-scale applications. Most ceramic, glass, carbon and zeolitic membranes cost between one- and three-orders of magnitude more per unit of membrane area when compared to polymeric membranes and furthermore are difficult to fabricate into large, defect-free areas. An advantage of polymeric materials is that they can be processed into hollow fibers, which offer high separation productivity due to the inherently high surface area to volume ratio. Thus, most commercially available gas separating membranes are still made from polymers despite the limited membrane performance.

SUMMARY OF THE INVENTION

It is an object of the invention to provide substantially void free, mixed matrix membranes which include zeolites and polyimides, where the zeolites and polyimides are bonded together by hydrogen, covalent or ionic bonds.

It is another object of the invention to provide methods for making substantially void free, mixed matrix membranes, which include zeolites and polyimides.

The class of materials of the present invention are mixed-matrix membranes, which combine the processing versatility of polymers with the molecular sieving and sorption capabilities of zeolites. Predictions based on the Maxwell Model and Effective Medium Theory indicate that mixed matrix membranes have superior selectivities and productivities compared to polymers. Furthermore, such composite materials would be compatible with the existing composite asymmetric membrane formation technology and infrastructure. Similar to the current asymmetric composite hollow fibers consisting of an inexpensive porous polymeric support coated with a thin, high performance polymer, the mixed matrix material may consist of an inexpensive polymer hollow fiber coated with a thin polymer layer packed with ordered molecular sieving material. Alternatively, hollow fibers may be directly spun from colloidal dispersions consisting of zeolite particles suspended in a polymer solution. Bundles of the thus formed fibers can be collected together and used as a filter device in large scale gas filtering applications.

Elimination of defects at the molecular sieve/polymer interface and in the control of the film's microstructure at the sub-nanometer level is important. This can be achieved by employing zeolites whose size is in the nanometer range and whose surface is functionalized to promote interaction with the polymer matrix. As the size of the zeolites is reduced to approach that of the polymer chains, the surface area/unit mass of zeolite available for interacting with the polymer increases, allowing the zeolites to be effectively incorporated into the polymer structure. Zeolites can be fabricated with controlled nanometer size distributions and surface functionalization. A series of well-characterized polyimides with pendant carboxylic functional groups along the backbone, is an example of a polymer that can serve as the membrane matrix. These polyimides already have excellent separation properties for various gas mixtures and are thermally stable above 400° C. in air. In addition members of these series of polymers can be dissolved which enables efficient casting and self assembly methods.

DESCRIPTION OF THE DRAWING FIGURES

The foregoing and other objects, aspects and advantages will be better understood from the following detailed description of the preferred embodiments of the invention with reference to the drawings, in which.

DETAILED DESCRIPTION OF THE PREFERRED EMBODIMENTS OF THE INVENTION

The materials of the present invention include highly structured, zeolite/polyimide composite thin film membranes, which have a gas separation performance superior to that of existing polymer-based membranes. Further, the materials of the present invention preferably retain their processing versatility.

There are at least two different fabrication methods that may be used. The first method is to cast thin membrane films directly from colloidal zeolite dispersions mixed in a polymer solution and to use interactions of functional groups on the zeolites with the functional groups on the polymer chains to achieve a highly homogeneous distribution of zeolites in a polymer matrix. In a variation on this method, the polymer may be first functionalized with functional groups (e.g., pendant groups having one or more carboxylic acid moieties), and then these functional groups can be used for interacting with functional groups on the zeolites. The second method is a layer-by-layer film forming technique, which will allow to incorporating molecular sieving zeolites as ordered layers into a polyimide matrix using intermolecular interactions at the zeolite/polymer interface to drive self-assembly.

Materials of the present invention may include precise placement of a specified number of zeolite layers in the film. Furthermore, specific molecular interactions or direct covalent linking may be used to facilitate ordering (or orientation) of the zeolite on the supporting surface and to eliminate or reduce defects at the molecular sieve/polymer interface.

Figure 1:
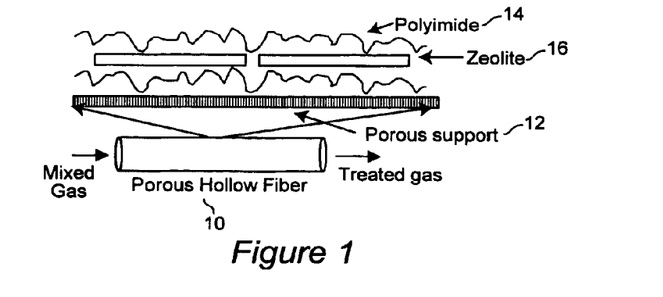
FIG. 1 is a schematic drawing of a mixed matrix membrane immobilized on a porous support.

FIG. 1 illustrates an example of composite membrane structure, which utilizes a porous hollow fiber 10. The porous support 12, which makes up the hollow fiber 10 can be a variety of different materials (e.g., ceramics, and polymers), but is preferably a porous polyimide (by porous it is meant that the material is permeable to gas) which is thermally matched to the polyimide matrix material 14. Zeolite material 16 is shown sandwiched between the polyimide matrix material 14. That is, the zeolite material 16 and polyimide material 14 are in defined layers or domains, and these layers can alternate many times, as would be the case if the membrane was made from using a self assembly method. The longitudinal axis of the zeolite fragments in the zeolite domain 16 are parallel to the porous support 12. Preferably the zeolite fragments are between 30 nm and 250 nm in length. The zeolite surface can be functionalized with groups such as amines and also can be coated with polyelectrolytes that control the charge of the zeolite fragments.

A feature of the present invention is to have a high aspect ratio where the length of the zeolite fragments is much greater (more than twice) the cross-sectional width, which will be exposed to the mixed gas 20. The treated gas 22 emerging from the porous hollow fiber 10 with the internal mixed matrix membrane will have a gas or particulate selectively removed by the zeolite 16 and polyimide 14 with greater proficiency and selectivity than the zeolite or polyimide alone.

The following calculations suggest the use of molecular sieve plate-like particles in the fabrication of mixed matrix membranes. Despite their limitations, calculations based on the effective medium approximation can be used in order to get order of magnitude estimates regarding the potential performance improvement of polymeric membranes from the addition of the zeolite phase. For particles that can be approximated as spherical, the effective permeability can be estimated for dilute systems from:

$$P_{eff,i}/P_{p,i} = \{2/P_{z,i} + 1/P_{p,i} - 2\phi_z(1/P_{z,i} - 1/P_{p,i})\}/$$ Eq. 1

-continued
$$\{2/P_{z,i} + 1/P_{p,i} + \phi_z(1/P_{z,i} - 1/P_{p,i})\}$$

where $P_{eff,i}$ is the effective permeability of species-i, in the composite (mixed-matrix) membrane, $P_{p,i}$ and $P_{z,i}$ are the corresponding permeabilities in the polymer and zeolite phase respectively, and $\phi_z$ is the volume fraction of the zeolite in the mixed matrix material. From this expression, one an easily see that the effective permeability is largely determined by the permeability through the continuous phase, i.e., for the case of mixed matrix membranes, the polymer phase.

For example, consider a likely scenario in which an A–B binary mixture (say nitrogen and oxygen) where the permeability of A in the zeolite is very small so that it can be approximated as zero, and the permeability of B in the zeolite is equal or larger to the permeability of B in the polymer phase. First, we can easily find an estimate for the permeability of A by setting $P_{z,A}$ equal to 0 in Eq.1:

$$P_{eff,A}/P_{p,A}=2(1-\phi_z)/(2+\phi_z)$$ Eq. 2

Regarding the permeability of B, $P_{eff,B}$, it is expected to be at least equal to the permeability of B in the polymer phase, $P_{p,B}$ (for equal permeabilities of B in the polymer and the zeolite), and up to a maximum value of $(1+2\phi_z)/(1-\phi_z)$ (by setting $P_z$ to infinity in Eq. 1).

According to the above effective medium calculations considering, for example, a 30% loading the permeability of component A in the mixed matrix membrane, $P_{eff,A}$ is expected to be 61% of the permeability of A in the polymer phase, $P_{p,A}$. The corresponding estimate for the permeability of B, $P_{eff,B}$ ranges from a value equal to that in the polymer up to at most 2.3 times higher than the permeability in the polymer. As a result, for 30% loading with zeolite crystals that are impermeable to A and highly permeable to B, and have isotropic shapes so that they can be approximated by spheres, the effective medium approximation predictions point to a selectivity enhancement ranging from 1.6 to at most 3.8. Even such small improvements in selectivity can be important in that they enable performance above Robeson's upper bound.

Figure 2:
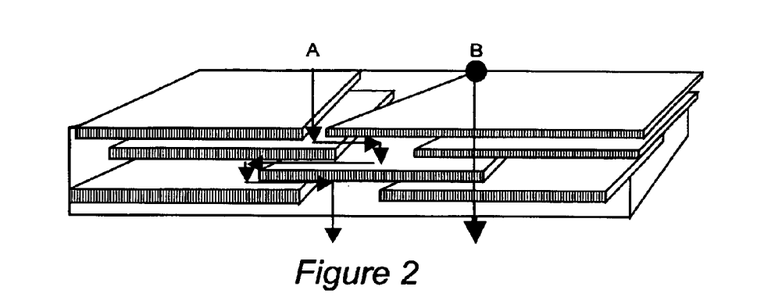
FIG. 2 is a schematic drawing of a plate like zeolite crystal arrangement with the plates parallel to the membrane surface.

Greater improvements are to be expected when using strongly anisotropic, plate-like zeolite crystals, arranged with their short axis perpendicular to the film surface as drawn schematically in FIG. 2. In such a case, considering a similar scenario as before, i.e, zeolite crystals impermeable to A but permeable to B, one has according to Cussler:

$$P_{eff,A}=\{1+\alpha^2\phi_z^2/(1-\phi_z)\}^{-1}$$ Eq. 3

In equation 3, $\alpha$ is the aspect ratio of the plates. Molecular sieve-like particles with channels along the plate thickness and an aspect-ratio between 30 and 100 are utilized. Using the conservative $\alpha=30$ we find that $P_{eff,A}$ is less than 1% of the permeability of A in the polymer phase. This value becomes even smaller as the aspect ratio increases. This is a dramatic reduction compared to the one calculated for isotropic zeolite particles and could lead to at least a 100-fold increase in selectivity provided that permeation of B along the thickness of the plates proceeds at least as fast as in the polymer phase.

Materials of the present invention preferably may incorporate amsotropic ETS-4, ZSM-2, LTL and MF1 plate-like particles in mixed-matrix membranes. These zeolites are inorganic crystalline structures with pores of the same size as single molecules, and they can separate molecules from a mixture with high selectivity due to the combination of molecular sieving and selective sorption. A unique aspect of zeolites is that they provide high selectivity over a broad range of operating conditions. Furthermore, the surface chemistry of the zeolites may be varied from amphoteric mixed metal oxides to amine-functionalized surfaces. All of these zeolites may be functionalized with appropriate chemical groups to facilitate binding or interaction with the polymer chains (e.g., covalent, hydrogen or ionic bonding). Zeolites are described in more detail in Meier, W. M., Olson, D. H. and Baerlocher C. "Atlas of Zeolite Structure Types", *Zeolites* 17(1–2), 1–229 (1996). The zeolites referenced herein can be synthesized using well known techniques to those of ordinary skill in the art.

ETS-4 is a material that, upon appropriate ion exchange and mild thermal treatment below approximately 300° C., can be used for highly selective separations of gases like $CH_4/N_2$, $Ar/O_2$, and $O_2/N_2$. The plate-like crystals are very thin (less than 50 nm) and 10 μm long×5 μm wide, which makes the ideal for enhanced performance mixed matrix membranes as discussed above. ETS-4 is a mixed octahedral/tetrahedral framework with a faulted structure related to the mineral zorite. It can be described as a random intergrowth of four pure hypothetical polymorphs. Due to the faulting, access in ETS-4 is through 8-rings (8R) despite the presence of larger openings in the structure. In this respect, ETS-4 is analogous to small pore zeolites. The framework structure and cation positions of as synthesized ETS-4 (Na-ETS-4) and of Sr ion exchanged ETS-4 has been reported in the published literature. ETS-4 has several distinct features when compared with zeolites as well as other mixed octahedral/tetrahedral frameworks. First is the presence of structural water suggested to exist in the form of bound chains along the channels. Second is the presence of titania octahedra or semi-octahedra that are connected to the rest of the framework through only four oxygen bridges to framework silicon atoms resulting in a planar as opposed to the common three dimensional connectivity encountered in microporous frameworks. As synthesized, Na-ETS-4 has been reported to collapse near 200° C. to an amorphous material. This is attributed to the loss of the structural water chains present along the channel system. Upon appropriate ion exchange (e.g., with Sr) the thermal stability can be extended to temperatures of up to 350° C. Moreover, during heat treatment there is a monotonic decrease in all three crystallographic directions with increasing temperature of dehydration. Crystal structure refinement using powder neutron diffraction data indicate that the unit cell volume decrease is accompanied by a corresponding decrease in the 8R that controls access to the interior of the framework.

The overall three-dimensional crystallographic lattice contraction described above, and the accompanying physical contraction of the 8R that controls the access of adsorbates in the interior of the molecular sieve, sequentially excludes smaller and smaller molecules with increasing temperature of dehydration. Adsorption studies indicate that this is the case and a range of contacted materials that are essentially infinitely selective for important gaseous couples, i.e., $N_2$ over $CH_4$, $O_2$ over $N_2$, can be prepared. The availability of the plate-like ETS-4 crystals combined with their proven selectivity potential, make them ideal for use in mixed matrix membranes. Moreover, other morphologies of ETS-4 crystals an be prepared ranging from equiaxed crystals to needle-like allowing systematic variations of the zeolite size and shape in the mixed-matrix membrane.

The ZSM-2 is a faujasite related zeolite consisting of continuous blocks (intergrowths) of the cubic FAU and hexagonal EMT structure types (see Atlas of zeolite Structures). ZSM-2 contains silicon as well as aluminum. In order to balance the resulting framework charge (Si has +4 and Al has +3) extra framework cations are present. The kind of the cation can be varied by ion-exchange procedures. The crystals are hexagonal prism shaped with the longest direction being approximately 250 nm. The framework density of Faujasites is around 1.31 $g/cm^3$ and the pore size of Faujasite crystals is approximately 0.74 nm. They can be used for the separation of $CO_2/N_2$ as well as of mixtures of saturated from unsaturated hydrocarbons. The separations are not based on molecular sieving, but are rather due to preferential adsorption of $CO_2$ and of the unsaturated hydrocarbon, respectively on the cation sites. For example, benzene/cyclohexane separation factors larger than 100 were recently reported for Na—X zeolite membranes.

Zeolite L has a one-dimensional large-pore system parallel to its c-crystallographic axis. It also contains both aluminum and silicon in the framework and as a result has extra-framework cations that can be ion exchanged to tailor its adsorption properties. Zeolite L can be synthesized in a variety of shapes and sizes ranging from 30 nm particles to flat plates with aspect ratio of at least 100. In the plate-like zeolite L crystals, the one-dimensional channels are running along the thickness of the plates as desired. The availability of other crystal shapes allows systematic variations of mixed matrix membrane microstructure for this zeolite as well.

Zeolite NaA (LTA) and high silica MFI (silicalite-1) may also be used in materials of the present invention. Unfortunately, despite its potential for $O_2/N_2$ separations, the shape of Zeolite A cannot be manipulated as this zeolite can only be synthesized in spherical or cubic shapes due to its cubic crystalographic symmetry. On the other hand, the shape of silicalite-1 can be manipulated by choice of structure directing agent and growth conditions. Silicalite-1 is an all silica zeolite with the MFI framework topology. The material is hydrophobic with intersecting straight and sinusoidal pores with approximate pore diameter of 0.55 nm. It is highly suitable for separations such as alcohol/water (adsorbing preferentially the alcohol) and of close boiling hydrocarbon isomer (e.g., xylenes, butanes) mixtures. For example, silicalite-1 membranes prepared on porous a-alumina supports show p-xylene to o-xylene separation factors larger than 100. A disadvantage of silicalite-1 is that its synthesis results in the structure-directing agent (tetrapropylammonium ions) in the framework and as a result calcination is required. However, it is possible to calcine silicalite-1 crystals avoiding unwanted agglomeration. A variety of silicalite-1 crystals may be used in the practice of this invention ranging from the 40–100 nm spherically shaped twin nanocrystals, to disk-like and thin coffin-shaped crystals. In the last two morphologies the straight channels, i.e., the faster intrazeolitic transport pathways, are running down the thin crystal dimension as desired in order to realize the proposed architecture.

Glassy polyimides, i.e., those that have a glass transition temperature above room temperature, are preferably used in the practice of this invention. The ZSM-2 is a faujasite related zeolite consisting of continuous blocks (intergrowths) of the cubic FAU and hexagonal EMT structure types (see Atlas of zeolite Structures). ZSM-2 contains silicon as well as aluminum. In order to balance the resulting framework charge (Si has +4 and Al has +3) extra framework cations are present. The kind of the cation can be varied by ion-exchange procedures. The crystals are hexagonal prism shaped with the longest direction being approximately 250 nm. The framework density of Faujasites is around 1.31 g/cm$^3$ and the pore size of Faujasite crystals is approximately 0.74 nm. They can be used for the separation of $CO_2/N_2$ as well as of mixtures of saturated from unsaturated hydrocarbons. The separations are not based on molecular sieving, but are rather due to preferential adsorption of $CO_2$ and of the unsaturated hydrocarbon, respectively on the cation sites. For example, benzene/cyclohexane separation factors larger than 100 were recently reported for Na—X zeolite membranes.

Zeolite L has a one-dimensional large-pore system parallel to its c-crystallographic axis. It also contains both aluminum and silicon in the framework and as a result has extra-framework cations that can be ion exchanged to tailor its adsorption properties. Zeolite L can be synthesized in a variety of shapes and sizes ranging from 30 nm particles to flat plates with aspect ratio of at least 100. In the plate-like zeolite L crystals, the one-dimensional channels are running along the thickness of the plates as desired. The availability of other crystal shapes allows systematic variations of mixed matrix membrane microstructure for this zeolite as well.

Zeolite NaA (LTA) and high silica MFI (silicalite-1) may also be used in materials of the present invention. Unfortunately, despite its potential for $O_2/N_2$ separations, the shape of Zeolite A cannot be manipulated as this zeolite can only be synthesized in spherical or cubic shapes due to its cubic crystallographic symmetry. On the other hand, the shape of silicalite-1 can be manipulated by choice of structure directing agent and growth conditions. Silicalite-1 is an all silica zeolite with the MFI framework topology. The material is hydrophobic with intersecting straight and sinusoidal pores with approximate pore diameter of 0.55 nm. It is highly suitable for separations such as alcohol/water (adsorbing preferentially the alcohol) and of close boiling hydrocarbon isomer (e.g., xylenes, butanes) mixtures. For example, silicalite-1 membranes prepared on porous a-alumina supports show p-xylene to o-xylene separation factors larger than 100. A disadvantage of silicalite-1 is that its synthesis results in the structure-directing agent (tetrapropylammonium ions) in the framework and as a result calcination is required. However, it is possible to calcine silicalite-1 crystals avoiding unwanted agglomeration. A variety of silicalite-1 crystals may be used in the practice of this invention ranging from the 40–100 nm spherically shaped twin nanocrystals, to disk-like and thin coffin-shaped crystals. In the last two morphologies the straight channels, i.e., the faster intrazeolitic transport pathways, are running down the thin crystal dimension as desired in order to realize the proposed architecture.

A series of polyimides that may be used in the present invention are based on 6FDA-6FpDA polyimides (e.g., 6-FDA-6FpDA-DABA, where 6FDA is 4,4'-hexafluoroisopropylidenediphthalic anhydride and 6FpDA is 3,5-daiminobenzoic acid and DABA is 3,5-diaminobenzoic acid), having various contents of pendant carboxylic acid side groups and a molecular weight around eighty thousand. The synthesis of these materials can be carried out by a number of techniques and has been reported in the published literature. The molar proportion of the anhydride to the acid is 1:1. The ratio of the two acids is varied from 0 to 100%. As can be seen in Table 1, these polymers already have excellent transport properties. ESCA results indicate that as the proportion of the diaminobenzoic acid used in the synthesis increases, the concentration of carboxylic groups present on the film surface increases. As the concentration of the carboxylic groups along the backbone increases, the overall permeabilities of the polymers decrease as a result of hydrogen bonding between the chains. These polyimides are soluble in solvents such as tetrahydrofuran (THF) and $CH_3Cl$ and can be cast into highly durable films. The thermal stability of these polymers extends up to 500° C. under nitrogen atmosphere and up to 400° C. in air.

TABLE 1

6FDA-6FpDA/DABA polyimides; physical data and permeation properties[c]

| % DABA[a] | O/F[b] ratio | $CO_2$ | $CH_4$ | $O_2$ | $N_2$ | He |
|---|---|---|---|---|---|---|
| 0 | 0.42 | 62.1 | 1.72 | 15.6 | 3.39 | 135 |
| 8 | 0.58 | 54.7 | 1.34 | 12.9 | 2.71 | 120 |
| 16 | 1.65 | 36.6 | 0.94 | 9.2 | 1.92 | 94 |
| 32 | 2.00 | 25.4 | 0.58 | 6.5 | 1.24 | 80.7 |
| 100 | 3.19 | — | — | — | — | — |

[a]The % DABA (diaminobenzoic acid) reflects the molar ratio of DABA to 6FpDA during synthesis. The carboxylic acid content in the polymer increases proportionately with the DABA content.
[b]The ratio of oxygen to fluorine atoms (O/F) is calculated from ESCA studies of the film surface composition and is largely dependent on the casting conditions. For the ESCA studies, all films were cast from THF solution.
[c]The gas permeation properties are reported in Barrers ($10^{-10}((cm^3(STP)$ cm)/($cm^2$ s cmHg))) and were collected at 35° C.

Finally, hydrocarbon separations require a polymer matrix, that is not susceptible to plasticization. A study of the permeation and separation behavior of several polyimide membranes to olefin/paraffin separations has shown that 6FDA-based polyimides have a relatively high performance when compared to other types of polyimides. For example, the reported permeabilities for propylene were $P_{C3H6}$=20–40 Barrers and an ideal separation factor $\alpha_{id}=(C_3H_6/C_3H_8)=11$ at 323° K. and 2 atm. However separation factors obtained using mixed gases were lower by 40% due to the plasticization effect. In the present case, since the polymer is effectively cross-linked with the zeolite particles in the mixed matrix membrane, the plasticization effect is minimized. Mixed matrix membranes based on silicalite ($\alpha$=100 for butane/iso-butane) and the hexafluorinated polyimide are useful in butane/iso-butane separations.

In addition, within the practice of this invention, commercially available polyimides may be functionalized with functional groups (e.g., carboxylic acids) using reagents, which will append moities containing carboxylic acid along the backbone of the polyimide. This would avoid having to synthesize the polyimides and/or purchase the 6FDA type polyimides described above. In addition, commercially available polyimides, modified with carboxylic acid moieties, for example, might provide enhanced properties such as toughness, flame retardance, resistance to creep, temperature resistance, and solvent resistance. Moreover, polymers other than polyimides (e.g., polyamides, polyethers, polyesters, polyurethanes) might be employed in the practice of this invention provided they are compatible with zeolites, and include or are functionalized to include functional groups (e.g., carboxylic acids) on their backbone which hydrogen bond, covalently bond or ionically bond with functional groups on the zeolite and provide a substantially void free interface between the zeolite and the polymer (i.e., no voids or voids present that are no larger than several Angstroms).

Membrane fabrication according to the invention may employ two different approaches for combining functionalized zeolites with functionalized polyimides. The first approach involves blending the desired concentrations of each component in a common solvent or solvents combination and then casting a film from the resulting solution. These processes preferably have zeolite/polymer ratios from 20 to 50% by volume. The second approach makes use of a layer-by-layer self-assembly process originally developed for ionically self-assembled monolayers (ISAM's). This approach allows the making of thin zeolite/polyimide membranes (less than 100 nm) on a microporous support (e.g., a support which is permeable by gas, such as a support having nanovoids) at volume fractions of zeolites approaching the close packing limit, i.e., greater than 60% by volume. Precise placement of a specified number of zeolite layers in the film make it possible to attain unprecedented control of the membrane microstructure and hence gas separation performance. Without intending to be bound by theory, the plate-like zeolites are believed to orient with their flat surfaces parallel to the support during deposition, due to gravitational and surface forces.

Figure 3:
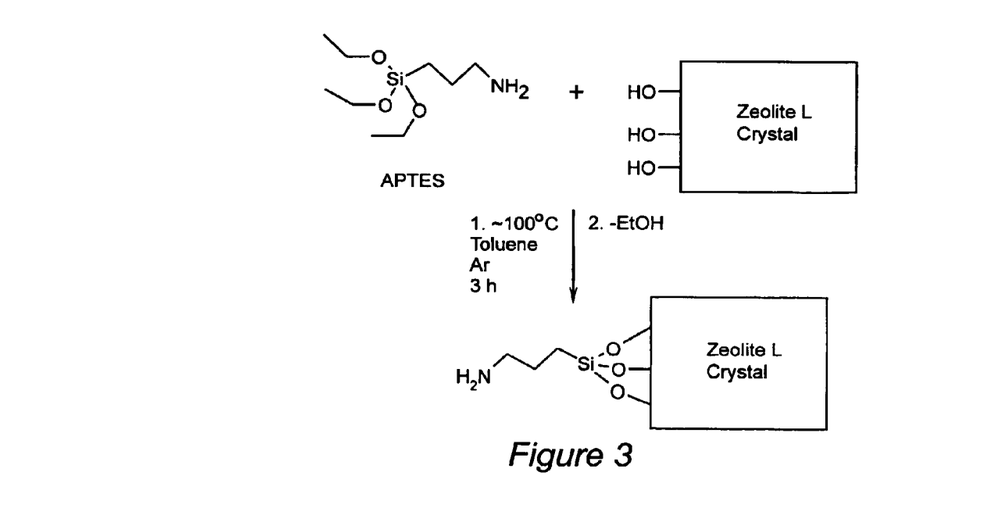
FIG. 3 is a schematic drawing showing the functionalization of a zeolite crystal with an ammonia moiety.

Functionalization of the zeolite surface may be achieved by tethering, silanation or by physisorption of polyelectrolytes onto the zeolite. One embodiment of the present invention includes silanating the ZSM-2 zeolites (for example) with aminopropyltriethoxysilane (APTES), which introduces an amine group on the zeolite surface. FIG. 3 illustrates this embodiment. Before mixing the zeolite with polymer, the zeolite surface is chemically altered to promote adhesion between the polymer and the zeolite. The zeolite is added to toluene and allowed to disperse by stirring. APTES is later added to the mixture. The ratio of reactants is 50 mg of zeolite:10 ml toluene:0.66 ml APTES. The mixture is then heated until the toluene refluxes (100–110° C.). A wide variety of other silane coupling agents may also be used in the practice of this invention and would employ similar procedures. In addition, the zeolite may be functionalized with more than one functional group (e.g., two or more amine moieties (or two or more carboxylic acid moieties if the polyimide or other polymer is functionalized with amine moieties)). This example, where the zeolite is functionalized with amines, takes advantage of an acid-base salt formation between the carboxylic acids on the polymide and amine bases adhered on the zeolite.

Figure 4:
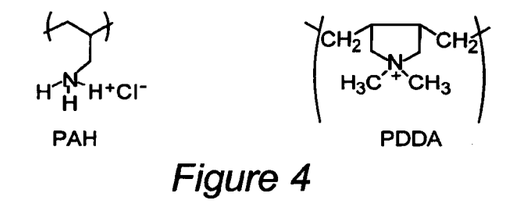
FIG. 4 shows the chemical structures of possible cationic polyelectrolites which can be physisorbed onto a zeolite surface.

Physisorption of polyelectrolytes to the zeolites occurs by electrostatic attraction between oppositely charged zeolites and polymer chains. This is readily achieved by mixing cationic polyelectrolytes such as poly(allylamine hydrochloride), PAH and polydiallyl dimethylammonium chloride, PDDA (general structures shown in FIG. 4) with zeolite suspensions in water at a pH greater than the isoelectric point (IEP) of the zeolite where the net charge on the zeolite is negative. Zeolite A has an IEP of approximately 5. The sign of the zeta potential of aqueous zeolite A suspensions can be changed via the addition of PDDA. The addition of PDDA at a weight concentration as low as 0.1% w/w PDDA/zeolite was sufficient to change the zeta potential of the zeolite from an initial value of −40 mV to +20 mV.

Figure 5:
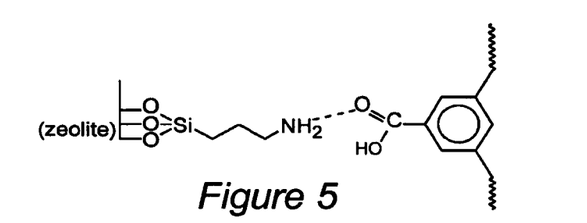
FIG. 5 is schematic showing hydrogen bonding between the zeolite amine and the carboxylic acid on the polymer.

Another approach is through direct blending. This approach introduces functionalized zeolites into a polyimide solution in a fashion that achieves a homogeneous distribution of zeolites in the polyimide matrix. Solvent may include THF, acetone and $CH_3Cl$. The strength of hydrogen bonding between the amine group on the zeolite (whether tethered or physisorbed using a surface active agent) and the carboxylic acid group found along the polyimide backbone may vary with the type of solvent, the relative composition of the mixed matrix and the solution concentration. FIG. 5 shows the schematic of this interaction. For most hydrogen-bonded complexes, the hydrogen bonding strengths decrease as the solvent changes from aliphatic hydrocarbon to chlorinated hydrocarbon, to a highly polar liquid. The strong adsorption of the polyimide to the functionalized zeolite lead to colloidal dispersion and stabilization of the zeolites. The strength of the hydrogen bonding interaction may be studied directly by Fourier Transform Infrared Spectroscopy (FTIR) and indirectly by rheological measurements. Rheological measurements are very sensitive probes of particle-polymer interactions in suspension. Attractive interactions between zeolites can lead to the formation of a gel-like network, causing the suspension viscosity to increase markedly and to show significantly more shear thinning. Colloidal dispersion of the zeolites by the adsorption of polyimides suppress network formation, causing the suspension viscosity to decrease. The storage modulus G' will become much greater than the loss modulus G" as well. The static modulus will become progressively larger as the suspension becomes more flocculated.

While FIG. 5 shows a hydrogen bonding interaction, it should be understood that the zeolite can be joined to the polymer chain by a covalent bond or through ionic bonds in similar fashion.

A mixed matrix membrane based on 20/80 (zeolite/polymer) volume composition of silicalite in 6FDABA-32 polyimide was examined using scanning electron microscopy. The surface of the zeolites was tethered with 3-aminopropyltriethoxysilane. The membrane was formed by casting a 5 wt % solution of zeolitespolymer-THF onto Teflon plates and allowing the solvent to slowly evaporate over a six day period. The resulting film was highly homogenous and self-supporting and the SEM image showed well-dispersed zeolites in a coherent polymer matrix with good interfacial contact. FTIR studies revealed that hydrogen bonding occurs between the amine groups on the tethered zeolites and the carboxylic groups pendant on the polymer chain. Both the polyimide and mixed matrix films were cast from THF. Comparison studies of the spectra (at two different frequency ranges) of the pure polyimide with the spectra of a polyimide obtained by subtracting a spectrum of a tethered zeolite from a spectrum of a mixed-matrix system were performed. Hence, the subtracted spectra should reflect the polyimide in a mixed matrix environment. Both the hydroxyl and carbonyl regions showed evidence of hydrogen bonding in the mixed matrix system. For example, a peak at 3085 $cm^{-1}$, representative of a self-associated carboxylic acid dimer, decreased substantially when the functionalized polyimide was in a mixed matrix environment. The free O—H stretch, a band at 3500 $cm^{-1}$, was absent in the subtracted spectrum. Instead, we saw a peak at 3270 $cm^{-1}$ which corresponds to singly hydrogen bonded hydroxyl groups. In the carbonyl region, we not only saw a slight shift of the carbonyl band to lower wavenumbers, but also the appearance of a whole new band at 1670 $cm^{-1}$ associated with carbonyl moieties hydrogen bonded to an amine. We were not able to distinguish between the carbonyl groups in carboxylic acid dimers and the imide carbonyls because of band overlap. Nevertheless, our results showed that during the dissolution step, self-associated carboxylic groups break up and (along with any free carboxylic groups) subsequently hydrogen bond with the more accessible amine groups tethered to the zeolite surface. Enhanced hydrogen bonding may be achieved if pendant groups having two or more functional groups (amines or carboxyilic acids) were employed.

The layer-by-layer technique involves the deposition of monolayers of oppositely charged or chemically complimentary polymers and zeolite crystals to form composite films with control of the composition at the 1–5 nm scale.

This is readily done at ambient conditions with simple and inexpensive equipment. The membrane includes a thin polymeric film with a homogeneous distribution of zeolite particles, supported by a porous polymer support (either commercially available polypropylene or a polyetherimide from GKSS, Germany) with minimal transport resistance. This procedure reduces the formation of defects and pinholes and permits control of the placement of the zeolite particles, as deposition occurs one monolayer at a time, driven by the specific molecular interactions. In addition, this approach permits higher zeolite loading capacities into the mixed matrix membrane than simple blending.

A variation of the ISAM process in which attractive electrostatic and hydrogen bonding interactions drive self-assembly may be used to form zeolite/polyimide films. The organo-soluble polyimide that is functionalized with carboxylic acid groups (e.g. 6FDABA-32) is deposited onto a substrate from an organic solution. The excess polyimide is rinsed away to leave a monolayer of adsorbed polyimide. The polyimide coated substrate is then dipped into an aqueous dispersion of zeolite crystals functionalized with physisorbed polycations such as PAH or with covalently attached amines from silanating reactions. The carboxylic acid groups on the polyimide will lead to strong interaction between the zeolite surface and the polyimide by electrostatic interactions and by hydrogen bonding.

For example, when the zeolite is deposited from an aqueous suspension in the pH range 6<pH<8, the secondary amine groups on the PAH (physisorbed to the zeolite) strongly interact with the carboxylic acid groups electrostatically. When the zeolite is deposited from an aqueous suspension at pH=4 which is the pKa of the carboxylic acid on the polyimide, then 50% of the carboxylic acid groups on the polyimide surface will be charged and the other 50% will be uncharged. Under these conditions, electrostatic attractive interactions will occur between the dissociated acid and the protonated PAH. In addition, hydrogen bonding will occur between the undissociated —OH groups on the carboxylic acid and the PAH. The strength of the hydrogen bonding and electrostatic interactions in these films will be characterized using FTIR spectroscopy as a function of the carboxylic acid group content in the polyimide.

Once the zeolite layer is deposited onto the polyimide-coated substrate, another layer of polyimide is deposited onto the film by dipping the film into the polyintide solution in an organic solvent. Hydrogen bonding interactions between the amine-functionalized zeolite and the carboxylic acid groups on the polyimide will drive adsorption. The dipping process can then be repeated to build up, layer-by-layer, a mixed zeolite-polyimide film with an arbitrary number of zeolite-polyimide bilayers with precise placement of the zeolite at specified layers.

Another scheme that may be utilized is to covalently link functionalized zeolites to polymer chains to improve membrane mechanical stability and reduce defects at the zeolite/polyimide interface. Zeolites with secondary amine functionalities react with pendant carboxylic groups on the carboxylic acid-substituted polyimide, using heterobifunctional crosslinkers as shown below in FIG. 6. One suitable heterobifunctional crosslinker is EDC [1-Ethyl-3-(3-Dimethylaminopropyl)-carbodiimide hydrochloride]. EDC is water-soluble and, at room temperature and pH=5–7, activates the carboxylic acid into a more reactive ester intermediate, which facilitates the nucleophilic attack of the amine group; NHS (N-hydroxysuccinimide) is added to stabilize the reactive intermediate until this nucleophilic attack occurs. The resulting crosslink is an amide bond. EDC is known as a "zero-length crosslinker" since it does not introduce any spacer groups between the carboxylic acid and amine groups. The process can be repeated for subsequent layers. By varying the number of carboxylic groups along the back-bone of the polyimide, the permeation properties of the resulting membranes may vary.

The composition and morphology of the surface layers of the membranes may be characterized by contact angle measurements, X-ray Photoelectron Spectroscopy (XPS), X-ray diffraction, atomic force microscopy (AFM), and scanning electron microscopy (SEM) to ensure controlled, reproducible chemistries. This characterization may be done after each surface treatment step and each film layer deposition step. Contact angle measurements provide a sensitive probe of the outermost atomic layers on a surface. Preferably the dipping solutions, organic or aqueous, wet the substrates and subsequent films to ensure homogeneous film deposition.

X-ray diffraction, including pole-figure measurements, may be used for phase identification and determination of the orientation of the zeolite crystals. XPS may be used to probe the topmost 1.5–5 nm of the films and provide detailed information about bonding states and also composition by atomic ratio. This technique may be used for verifying the proper surface chemistries of the substrates prior to membrane deposition as well as for tracking polyimide and zeolite deposition in conjunction with contact angle measurements and UV-Vis spectrophotometry. Auger spectroscopy provides depth profile information at depths of greater than 5 nm. AFM and SEM may be used to characterize the film morphology and to detect any film defects, which would be related to inhomogeneities in the film formation steps. AFM provides a particularly useful diagnostic test for film homogeneity and reproducibility since, in the tapping mode, AFM can routinely characterize polymer film morphology with a height resolution of ±0.1 nm.

The polymer deposition per dipping step can be followed by UV-Vis spectrophotometry, fluorescence spectroscopy, and by FTIR microscopy. In all of the approaches for making films, the amount of deposited polymer is preferably the same for each layer. Thus the amount of deposited polymer should increase linearly with the number of deposited layer. The thickness of each deposited layer can be measured by variable angle ellipsometry to provide measurements of film thicknesses with a resolution of ±0.2 nm.

The results of the aforementioned physical characterization studies can be correlated with gas permeability measurements. Specifically, permeabilities of gases such as Ar, $CO_2$, $N_2$, $O_2$, $H_2$ and $CH_4$ and hydrocarbons, such as propane and butane, can be determined as a function of temperature and pressure.

One problem encountered in developing mixed matrix membranes for gas separations has been the poor contact between rigid polymers and zeolites at the interface. This phenomenon leads to voids and other defects within the membrane resulting in poor separation performance. The present invention includes a method, which encourages adhesion at the interface and is aimed at fabricating mixed matrix membranes composed of a polyimide and functionalized zeolite.

Figure 7:
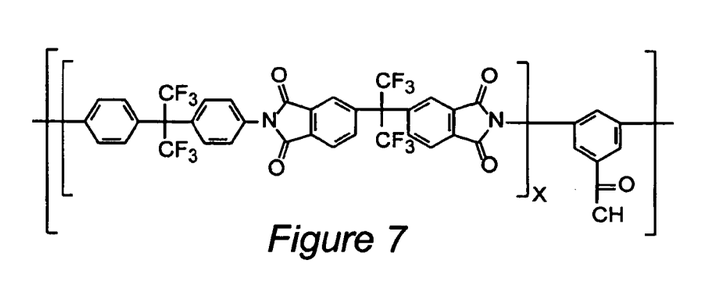
FIG. 7 is a chemical structure drawing of a repeat unit of 6FDA-6FpDA-DABA.

High molecular weight functionalized polyimide polymers (i.e. 93,000 g/mol) were synthesized for the purpose of fabricating a mixed matrix membrane. The polyimide 6-flourodianhydride-6-flouro-p-diamine-diaminebenzoic acid, or 6FDA-6FpDA-DABA, was produced by reacting, a dianhydride, a diamine, and a diamino acid in a step growth reaction. FIG. 7 shows a 6FDA-6FpDA-DABA repeat unit.

This polymer was mixed in solution with zeolites and cast as a thin film to fabricate the mixed matrix membrane (MMM). ZSM-2 nanocrystals are composed of silicon-oxygen bonds in a cyclic hexagonal as confirmed by FESEM image. The zeolites were functionalized to provide secondary forces between the zeolites and the polymer, achieving good adhesion between the two components. Aminopropyltriethoxysilane (APTES) was added to a zeolite-toluene solution and refluxed under an Argon atmosphere to add a primary amine to the zeolite. The reaction is illustrated in FIG. 3 and is discussed above. The tethered zeolites were then added into a polymer-tetrahydrafuran mixture. MMMs containing 20/80 weight % zeolite/polymer as well as 50/50 weight % zeolite/polymer were fabricated.

The step taken from FIG. 3 to produce a mixed matrix membrane depends on which method of fabrication is used. Exemplary procedures for (1) solution casting, or (2) doctor blading are set forth below.

Solution casting involves casting a mixture of zeolite, polymer and solvent onto a surface (preferably polytetrafluoroethylene (PTFE) coated) and allowing the solvent to evaporate. Once the zeolites have been modified using APTES and isolated into THF or other suitable solvent, the steps of this procedure may include:

1) Add the polymer to the zeolite-THF mixture. The amount of polymer added depends on the desired final content of the mixed matrix membrane (e.g., the desired zeolite weight percent of the final membrane).
2) If necessary, add THF so the mixture has between 1–5% solids content. Solids content is the weight of the zeolite and the polymer divided by the weight of the zeolite and polymer and THF.
3) Cast this mixture onto a clean Teflon coated pan. Cover the pan with a glass plate to slow the evaporation of the solvent.
4) When the solvent has evaporated (usually 1–2 days), remove the glass plate.
5) Begin an annealing procedure.

Doctor blading involves casting a more viscous solution onto a surface (preferably PTFE coated) and allowing the solvent to evaporate. For example, once the zeolites have been modified using ATPES and isolated into THF, the steps for this procedure may be:

1) Add the polymer to the zeolite-THF mixture. The amount of polymer added depends on the desired final content of the mixed matrix membrane (e.g., the desired zeolite weight percent of the final membrane).
2) If necessary, add or remove THF so the mixture has roughly 25% solids content. Solids content is the weight of the zeolite and the polymer divided by the weight of the zeolite and polymer and THF.
3) Cast the solution onto a PTFE coated surface.
4) Use a doctor blade with a preset height to smooth out the casted mixture.
5) Cover the surface with a glass plate to slow the evaporation of the solvent.
6) When the solvent is evaporated (typically 12 hours), remove the membrane and being the annealing procedure.

Exemplary annealing procedure.
1) Place the membrane under vacuum at a temperature of 50° C. for 5 hours.
2) After 5 hours at 50° C., raise the temperature to 150° C. for 5 hours.
3) After 5 hours at 150° C., raise the temperature to 220° C. for 12 hours.
4) After 12 hours at 220° C., turn off the heater and allow the membrane to cool to room temperature while still under vacuum.
5) When the membrane reaches room temperature, remove the vacuum.

An exemplary procedure for making a mixed matrix membrane composed of self assembled monolayers is as follows, and begins with the polymer in a thin film form, and zeolites have preferably previously undergone a reaction with a surface active agent as discussed above in conjunction with FIGS. 3 and 4.

1) Disperse chemically altered zeolites into a liquid.
2) Immerse the polymer film into the same liquid.
3) Slowly withdraw the polymer from the film; this will leave a zeolite coating on the polymer
4) Allow to air dry,
5) When dry, dip the zeolite coated film into a solution containing dissolved polymer, and slowly remove.
6) Allow to air dry.
7) Repeat steps 2–6 as many times as necessary to reach desired number of zeolite and polymer layers.

The method described herein should work for any polymer and zeolite combination, provided the two are capable of interacting with each other. Because most zeolites have hydroxyl groups on their surface, they can be modified using the same reaction shown in FIG. 3. This allows one to develop a MMM for specific gas separation by choosing a zeolite intended for that separation. Examples of zeolites that could be used in for developing MMMs are Zeolite 4A, ZSM-2, Silicalite, Zeolite L, and ETS-4. Additionally, the reaction used to modify the zeolites can use a reactant other than APTES. N-(2-aminoethyl)-3-aminopropyltriethoxysilane, N-(6-aminohexyl)aminopropyltrimethoxysilane, and (3-trimethoxyzilypropyl) diethylenetriamine are other reactants that could be used to functionalize the zeolites. In addition, the modified zeolites and functionalized polymer could be made to react with each other, resulting in a covalent bond between them as opposed to simply interacting through secondary forces. There are many polymers that can be synthesized to posses groups capable of interacting through secondary forces with the modified zeolites, or react with the modified zeolites.

EXAMPLE

Mixed Matrix membranes of 6FDA-6FpDA-DABA, a glassy polyimide, and modified zeolites (ZSM-2) were successfully fabricated using the procedure outlined in this paper. The membranes were cast from solution, and then exposed to different gases for the purpose of determining and comparing the diffusivity coefficients, the solubility coefficients, and the permeation rates of He, $O_2$, $N_2$, $CH_4$ and $CO_2$ of the pure polyimide and the composite membrane.

FTIR spectra were collected from the pure polyimide, the polyimide and untethered zeolite solutions, and the mixed matrix membrane (MMM) solution. Comparison of the spectra revealed the presence of hydrogen bonding in the MMM solution not present in the other samples. FESEM images and TEM images did not reveal the presence of voids between the polymer and the zeolite. These images also revealed that when given ample time for the solvent to evaporate, the zeolites sediment to one side of the membrane. This develops a polymer rich phase and a zeolite rich phase, and many of the ZSM-2 zeolites appear to adopt an orientation with their largest face orthogonal to the direction of the gas flow.

Introduction

Several research efforts intended on surpassing the Robeson's 1991 upper bound trade off curve [1] have focused on the development of mixed matrix membranes, which combine the outstanding separation performance of the zeolites with the processing capabilities and low cost of polymers. Potential applications of these new membranes have been discussed elsewhere [2].

Mixed Matrix Membranes (MMM) developed from rubbery polymers and zeolites have been fabricated and characterized, showing enhanced separation behavior [3,4,5]. However, attempts at fabricating MMM using glassy polymers and zeolites resulted in presence of voids at the polymer-zeolite interface, this reducing the separation performance of the composite membrane relative to the pure polymer [4,5]. To overcome these defects, several different silane coupling agents were successfully employed to improve adhesion between the polymer and zeolite, however, the resulting permeabilities were slightly lower, and ideal selectivities were largely unchanged when compared to the pure polymer [3–5].

Other attempts at developing glassy polymer-zeolite composite membranes have focused on fabrication methods without modifying the zeolite surface. Gür combined molecular sieve 13× and polyethersulfone (PES) through a melt extrusion process [7]. The two components were dried and extruded through a thin slit die to produce defect free membranes. However, the resulting membrane's permeation properties did not change significantly relative to the pure PES membrane. Süer et al simply mixed polyether-sulfone with either zeolite 13- or zeolite 4A and solution cast the mixture [8]. However, they used three different solution drying and annealing procedures to fabricate the membranes, one of which resulted in improved permeability and selectivity relative to the pure PES. Yong et al developed interfacial void free polyimide mixed matrix membranes by using a low molecular weight chain capable of hydrogen bonding with both the polymer and zeolite [9]. This chain essentially enhanced the contact between the two components. The resulting membranes displayed increased permeability without much change in the selectivity.

In this EXAMPLE section, we present a method to fabricate defect free mixed matrix membranes, relying on the hydrogen bonding interaction between amine terminated silane coupling agents that are tethered onto zeolite surfaces, and acidic groups incorporated into the polyimide backbone.

Experimental

The synthesis and characterization of the 6FDA-6FpDA-DABA polyimide is described elsewhere in detail [10] The polymer is based on 75 mol % 4,4'-hexaflouroisopropylidene dianiline (6FpDA) and 25 mol % diaminobenzoic acid (DABA) and has a weight average molecular weight 93,000 g/mol. The repeat unit of polyimide is shown in FIG. 7. ZSM-2 zeolite was synthesized as described elsewhere [11]. ZSM-2 is regarded as a faujasite type zeolite. The structure of ZSM-2 contains both Si and Al, therefore a cation was needed to balance the charge; the cation chosen was Li. The ratio of Si/Al falls between 1–1.5, which catagorizes the zeolite as a Na—X form of faujasite. The ZSM-2 crystals posses a hexagonal shape with the longest direction ~250 nm, and a pore size of 0.74 nm. The framework density of faujasites is ~1.31 g/cm$^3$.

Once synthesized, the zeolites were centrifuged and their aqueous solution was replaced with toluene. The mixture was added to a round bottom flask, and more toluene was added to provide a zeolite concentration of 6.2 mg/ml toluene. Aminopropyltriethoxysiliane (APTES) was then added such that a ratio 0.08 ml APTES/ml toluene was present in the flask before the reaction began. The mixture was then refluxed under an Argon purge for 2 hours. The reaction is outlined in FIG. 3.

Upon completion of the reaction, the mixture was centrifuged several times, each time replacing the solvent with tetrahydrafuran (THF). An amount of 6FDA-6FpDA-DABA required to produce a 20% weight ZSM-2, 80% weight polyimide mixed matrix membrane was added to the zeolite-THF mixture and allowed to mix for 24 hours. The solution was then cast onto a PTFE coated surface and allowed to evaporate over a two-day period.

The gas permeabilities of the pure polyimide and mixed matrix membrane were measured in a constant volume—variable pressure system. Using the time lag method, the permeability, diffusion coefficient, solubility coefficient, and theta time for both membranes were determined for He, $O_2$, $N_2$, $CH_4$, and $CO_2$. The gases were tested in that order for all membranes. The ideal selectivities were calculated using the pure gas permeabilities.

The changes in the chemical environment among the pure polyimide, the polyimide and untethered ZSM-2, and the mixed matrix solution were investigated by analyzing FTIR spectra (BIO-RAD, FTS-40A). The samples were prepared and tested as thin films. The presence of hydrogen bonding between the zeolite and polymer were determined by observing shifts to lower wavenumbers for interacting groups and noting changes in peak intensity.

Several instruments were employed to characterize the morphology of the composite membrane. Surface and cross sectional images of the composite membrane were gathered using a field emission scanning electron microscope (LEO 1550). Additionally, transmission electron microscopy (Philips 420T) cross sectional images were taken of the membrane. For both instruments cross sectional samples were embedded in epoxy and microtomed.

Results and Discussion

Spectroscopic Results:

FTIR spectra were taken in order to investigate the changes in the chemical environment between the polymer and zeolite once the ZSM-2 surface had been functionalized.

A sample consisting of polyimide, untethered ZSM-2, and APTES was prepared using the same concentrations as in the membrane fabrication process. However, immediately after adding APTES to the solution, the solution phase separated. This sample was never made successfully, and no spectra were collected with it.

The IR spectrum for the pure APTES showed a characteristic N—H stretching peak at 3382 cm$^{-1}$ corresponding to the primary amine [12]. FTIR spectra were also obtained for the polyimide, the polyimide and untethered ZSM-2, and the MMM solution in the 3600 cm$^{-1}$–2600 cm$^{-1}$ range.

Figure 8:
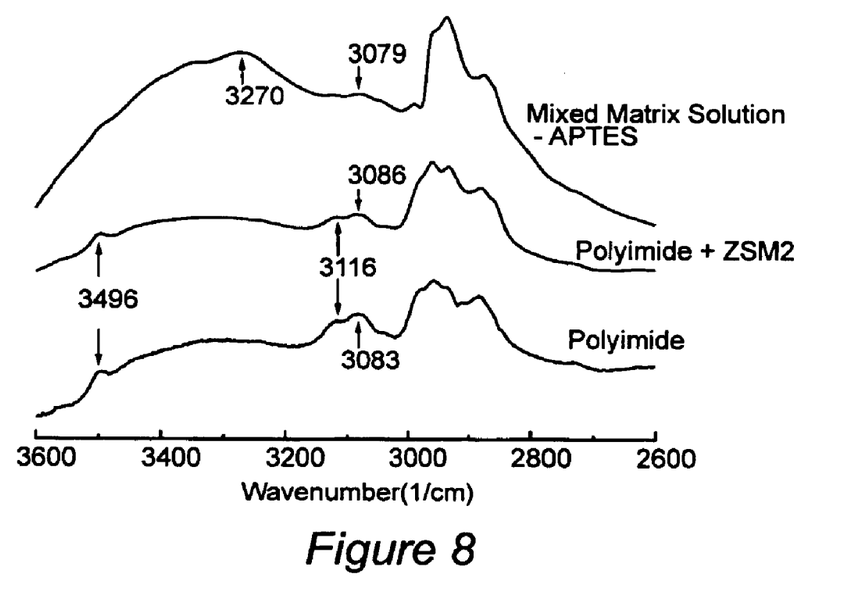
FIG. 8 are FTIR spectra for the pure polyimide (bottom), polyimide and untethered ZSM-2 (center), and the mixed matrix solution adjusted for APTES (top)

The Mixed Matrix Solution—APTES spectrum was optimized for this range by adjusting the magnitude of the pure APTES spectrum that was subtracted from the mixed matrix solution spectrum. The resulting curve removes the influence of self-associated amine groups that would be present in the pure APTES spectra, and leaves only the hydrogen bonded amine groups interacting with the carboxylic groups of the polyimide. The spectra are shown in FIG. 8.

These three curves appear to support the expected results of the experiment, specifically, successful functionalization of the zeolites with amine groups, and promotion of hydrogen bonding between these amine groups and the carboxylic groups located along the polyimide backbone. The polyimide curve displays a broad band ranging from 3500 $cm^{-1}$ to about 3200 $cm^{-1}$ and corresponding to —OH stretch associated with the carboxylic acid groups. While the 3500 $cm^{-1}$–3200 $cm^{-1}$ region of the spectrum indicates no change between the polyimide and the polyimide and untethered zeolite curves, in the subtracted mixed matrix spectrum this region shows the appearance of additional bands. This region contains the N—H stretch near 3400 $cm^{-1}$ and the hydrogen bonded N—H stretch near at 3270 $cm^{-1}$ of the amine, suggesting interaction between the ZSM-2 and the polyimide.

The 3150 $cm^{-1}$–3050 $cm^{-1}$ region of the polyimide and polyimide & ZSM-2 curves contains two peaks associated with the carboxylic group of the polymer. The left and smaller peak at 3116 $cm^{-1}$ results from unassociated carboxylic groups while the right peak at 3083 $cm^{-1}$ reflected the presence of self associated (i.e. hydrogen bonded) carboxylic groups. These peaks decrease in intensity in the mixed matrix curve due to the introduction of the amine groups which hydrogen bond with the carboxylic groups. To further support the interpretation of these results, the amine groups in pure APTES have an absorption at 3382 $cm^{-1}$ groups, whereas the tethered amine groups in the mixed matrix solution resonate at 3270 $cm^{-1}$. This shift to a lower wavenumber was taken as an indication of the presence of hydrogen bonding between amine groups and carboxylic groups.

Microscopy Results:

Several microscopy instruments provided detailed images of the membrane surface and interior at different magnifications. A field emission scanning electron microscope (FESEM) cross sectional image was taken, that revealed a membrane with two distinct regions: a polymer rich region and a zeolite rich region shown in FIG. 9.

Figure 9:
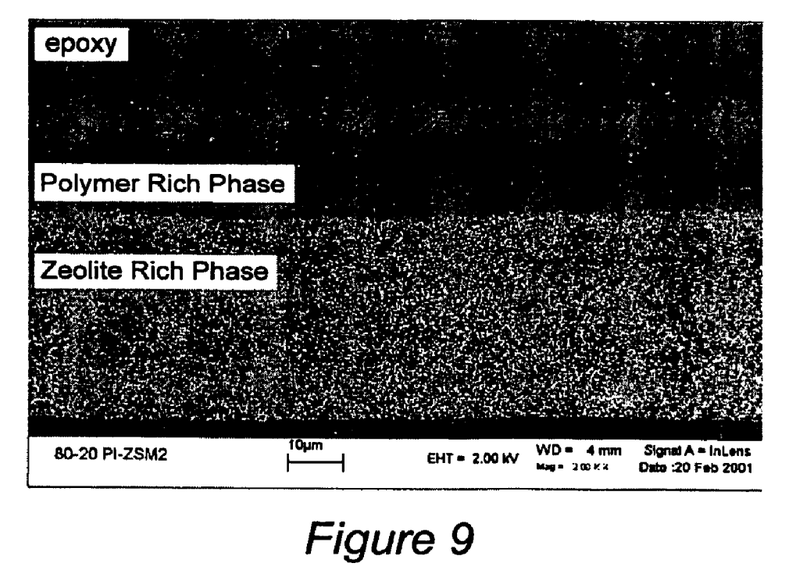
FIG. 9 is an FESEM image of a 20% weight surface modified ZSM-2 80% weight 6FDA-6FpDA-DABA membrane (the outer edges of both regions were embedded in epoxy in order to obtain the cross-sectional image)

Exploring both surfaces of the membrane using the FESEM confirmed that one surface contained a miniscule amount of ZMS-2, while the opposite surface carried a high concentration of the zeolite. Presumably, this sedimentation occurred during the membrane fabrication process as a result of the difference in the densities between THF ($\rho$=0.886 $g/cm^3$) and ZSM-2 ($\rho$=1.31 $g/cm^3$). The surface FESEM images gathered of the zeolite rich surface did not reveal the presence of voids between the polymer and the zeolite. Images taken of the same surface at lower magnifications revealed that the zeolite was well distributed across the surface and not agglomerated together, suggesting the modified ZSM-2 has an affinity for the polymer.

Figure 6:
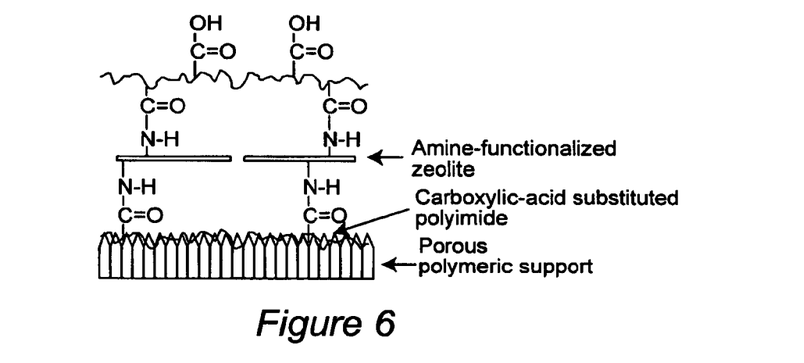
FIG. 6 is a schematic drawing showing a hybrid ISAM film with carboxylic acid substituted polyimide that is covalently attached to amine functionalized zeolites (the vertical scale on the porous support is exaggerated to illustrate mechanical interlocking of the polyimide chain with the rough substrate surface.
Figure 10:
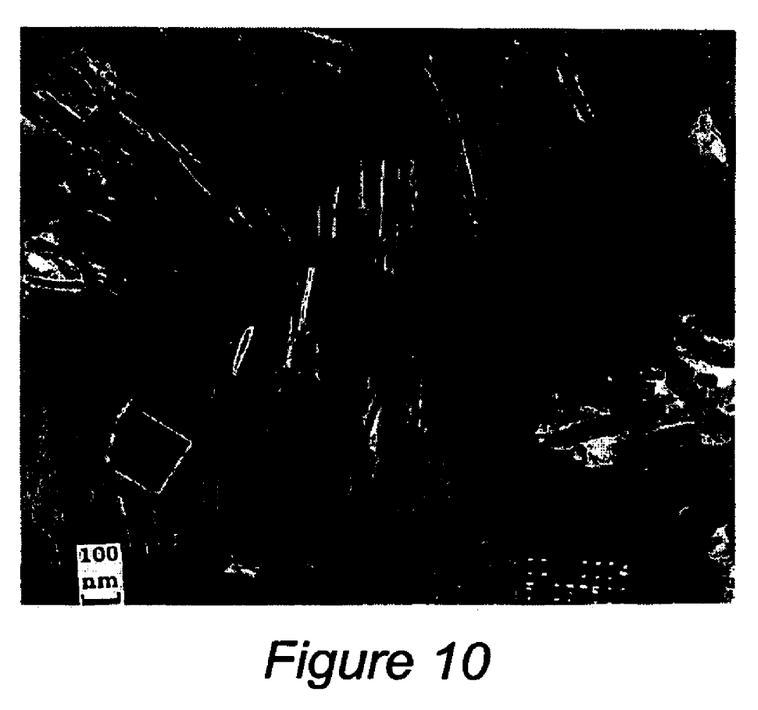
FIG. 10 is a TEM cross-sectional image of a 20% weight surface modified ZSM-2 80% weight 6FDA-6FpDA-DABA membrane.

Transmission Electron Microscopy images (TEM) taken of the cross section of the same membrane indicated that as these zeolites sediment, many of them appear to have a preference to orient themselves such that their largest face (i.e. hexagonal face) becomes parallel to the membrane surface as shown in FIG. 6. This orientation results in the largest ZSM-2 face being positioned orthogonal to the gas flux, and provides more zeolite surface area for the gas molecules to encounter.

This may be due to the hydrodynamic radius of the large zeolite. Although this phenomenon has not been pursued further as of yet, this orientation could yield better separation performance than the same membrane without the zeolite orientation.

Permeation Data:

The permeation properties of pure polyimide and mixed matrix membrane are summarized below in Table 2. All membranes tested had a thickness approximately 62 μm.

TABLE 2

Permeability Values for Different % Weight Zeolite Membranes

| | Permeability (Barrers) | | | | |
|---|---|---|---|---|---|
| % Weight ZSM-2 | He | $CO_2$ | $O_2$ | $N_2$ | $CH_4$ |
| 0% | 35.58 | 21.97 | 4.55 | 0.97 | 0.73 |
| 20% | 30.98 | 15.96 | 5.73 | 1.2 | 0.66 |

The permeability of the MMM dropped noticeably for He and $CH_4$ and significantly for $CO_2$ (27%). This suggests that the membrane did not contain the voids encountered by others. Interestingly, $O_2$ and $N_2$ permeabilities both increased by roughly 25%. The changes in permeation among the gases reflected the changes in the diffusion coefficients between the two membranes. $D_{O2}$ and $D_{N2}$ both increased by roughly 25%, while the other gas diffusion coefficients dropped as much as 37% (i.e. $CO_2$). The solubilities of most of the gases increased in the MMM with $CO_2$ showing the largest increase at 17%; $S_{N2}$ was the only solubility coefficient which decreased (−1%).

The diffusion and solubility coefficients are summarized in Table 3, while the ideal selectivities for certain gas pairs are summarized in Table 4.

TABLE 3

Diffusion and Solubility Coefficients for Different % Weight Zeolite Membranes

| | Diffusion Coefficient ($1 \times 10^{-8}$ $cm^2/s$) | | | | | Solubility Coefficient ($cm^3$ (STP)/$cm^3$ atm) | | | | |
|---|---|---|---|---|---|---|---|---|---|---|
| % Weight ZSM-2 | He | $CO_2$ | $O_2$ | $N_2$ | $CH_4$ | He | $CO_2$ | $O_2$ | $N_2$ | $CH_4$ |
| 0% | 763.6 | 3.04 | 9.65 | 4.31 | 0.69 | 0.035 | 5.49 | 0.36 | 0.17 | 0.80 |
| 20% | 536.9 | 1.89 | 11.92 | 5.38 | 0.58 | 0.04 | 6.42 | 0.37 | 0.17 | 0.87 |

TABLE 4

Ideal perm-selectivities for Different % Weight ZSM-2

| | Ideal Selectivities | | | | |
|---|---|---|---|---|---|
| % Weight ZSM-2 | $O_2/N_2$ | $CO_2/CH_4$ | $N_2/CH_4$ | $He/CO_2$ | $O_2/CH_4$ |
| 0% | 4.67 | 30.23 | 1.38 | 1.62 | 6.26 |
| 20% | 4.78 | 24.18 | 1.82 | 1.94 | 8.68 |

Although the selectivity of the $O_2/N_2$ separation was largely unchanged, the MMM provided a significant improvement when compared to the pure polyimide membrane due to the increase in permeation of $O_2$. Despite ZSM-2's good separation performance of $CO_2/N_2$ mixtures [13], the MMM performed poorly when compared to the pure polyimide membrane or the pure zeolite. This may be due the absence of calcination of the zeolites when in the MMM, leaving only a fraction of the ZSM-2 pore open for gas molecules. Furthermore, ZSM-2 does not separate based on size exclusion (pore size of 0.79 nm), but rather a preferential adsorption of $CO_2$ and unsaturated hydrocarbons on the cation sites. This phenomenon may be why $CO_2$ possessed the largest increase in solubility.

To realize the MMM's true separation ability, a mixed gas mixture should be used to evaluate the permeation properties. Using a gas mixture such as $CH_4$ and $C_2H_4$, or $CO_2$ and $N_2$ may reveal larger improvements in the selectivity for this MMM compared to the polyimide membrane. Furthermore, some of our recent work has focused on using zeolites that do not require calcination. Finally, annealing the membranes will most likely improve their performance.

Conclusions

In this study mixed matrix membranes were fabricated from a 6FDA-6FpDA-DABA polyimide and modified ZSM-2 zeolite. The ZSM-2 zeolites were functionalized with amine groups by reacting them with aminopropyltrimethoxysilane in toluene. Mixed matrix membranes were fabricated at 20% weight zeolite and 50% weight zeolite successfully, however the latter was too brittle to be used to gather data. The amine tethered zeolites interacted through secondary forces with the carboxylic groups along the polymer backbone as documented by FTIR studies. Band shifts associated with hydrogen bonding of the carbonyl and amine groups were observed in the spectra. These interactions promoted adhesion between the two components. The morphology of the MMM was documented by SEM and TEM studies and verified the absence of voids around the zeolites. This suggested that the zeolite and polymer had good contact at the interface. Permeation data of He, $CO_2$, $O_2$, $N_2$, and $CH_4$ were collected and analyzed. The solubility coefficient for each gas increased, except for $N_2$, which was largely unchanged. The changes in permeability for each gas correlated well with the change in the diffusion coefficient. The permeabilities of He, $CO_2$ and $CH_4$ all decreased, while $O_2$ and $N_2$ increased.

REFERENCES

1. Robeson, L.; *J. Membrane Sci.* 1991, 62, 165.
2. Koros, W. J.; Mahajan, R.; *J. Membrane Sci.* 2000, 175, 181.
3. Tantekin-Ersolmaz, S. B.; Atalay-Oral, C.; Tather, M.; Erdem-Senatalar, A.; Schoeman, B.; Sterte, J.; *J. Membrane Sci.* 2000, 175, 258.
4. Mahajan, R.; Koros, W. J.; *Ind. Eng. Chem. Res.* 2000, 39, 2692.
5. Zimmerman, C.; Singh, A.; Koros, W. J.; *J. Membrane Sci.* 1997, 137, 145.
6. Duval, J. M.; Kemperman, A. J. B.; Folkers, B.; Mulder, M. H. V.; Desgrandchamps, G.; Smolders, C. A. *Journal of Applied Polymer Science.* 1994, 54, 409.
7. Gür, T.; *J. Membrane Sci.* 1994, 93, 283.
8. Süer, M.; Bac, N.; Yilmaz, L.; *J. Membrane Sci.* 1994, 91, 77.
9. Yong, H. H.; Park, H. C.; Kang, Y. S.; Won, J.; Kim, W. N.; *J. Membrane Sci.* 2001, 188, 151.
10. Cornelius, C. J.; Ph.D. Dissertation, Virginia Tech, 2000.
11. Nikolakis, V.; Xomeritakis, G.; Abibi, Ayome.; Dickson, M.; Tsapatsis, M.; Vlachos, D. G.; *J. Membrane Sci.* 2001, 184, 209.
12. Tsapatsis, M.; Lovallo, M.; Davis, M.; *Microporous Materials.* 1996, 381–388.
13. Alpert, N.; Keiser, W. E.; Szymanski, H. A.; IR—Theory and Practice of Infrared Spectroscopy, Plenum Publishing Corporation, New York.
14. Tsapatsis M.; Nikolakis, V.; Vlachos, D. G.; Xomeritakis, G.; *J. Membrane Sci.* accepted (2000).

We claim:

1. A mixed matrix membrane, comprising
   zeolite;
   a surface active agent adhered by silanation to a surface of said zeolite and the zeolite surface is functionalized; and
   polyimide,
   said zeolite and said polyimide being bonded to each other by at least covalent bonds between said surface agent on said zeolite and said polyimide.

2. The mixed matrix membrane as recited in claim 1 wherein said zeolite is selected from the group consisting of ZSM-2, ETS-4, LTL and MFI.

3. The mixed matrix membrane as recited in claim 1 wherein said zeolite has a diameter of not greater than 500 nanometers.

4. A mixed matrix membrane comprising
   a faujasite;
   a surface active agent adhered to said faujasite; and
   polyimide,
   said faujasite and said polyimide being bonded to each other by at least one of hydrogen, covalent, and ionic bonds between said surface agent on said faujasite and said polyimide.

5. The mixed matrix membrane as recited in claim 1 wherein said polyimide is 6FDA-6FpDA-DABA.

6. The mixed matrix membrane as recited in claim 1 wherein said polyimide is a glassy polymer.

7. A mixed matrix membrane comprising:
   zeolite;
   a surface active agent adhered to said zeolite;
   polyimide functionalized with carboxylic acid moieties;
   said zeolite and said polyimide being bonded to each other by at least one of hydrogen, covalent, and ionic bonds between said surface agent on said zeolite and said polyimide.

8. The mixed matrix membrane as recited in claim 1 wherein said surface active agent is a polyelectrolyte.

9. A mixed matrix membrane comprising:
   zeolite;
   a polyelectrolyte adhered to said zeolite, wherein said polyelectrolyte is selected from the group consisting of poly(allylamine hydrochloride), polyldiallyl dimethylammonium chloride, and aminopropyltriethoxysilane; and
   polyimide,
   said zeolite and said polyimide being bonded to each other by at least one of hydrogen, covalent, and ionic bonds between said surface agent on said zeolite and said polyimide.

10. The mixed matrix membrane as recited in claim 1 wherein said surface active agent includes multiple amine groups per coupling entity.

11. The mixed matrix membrane as recited in claim 1 wherein said surface active agent includes a siloxane coupling entity coupled to said zeolite.

12. The mixed matrix membrane of claim 5 wherein said zeolite is ZSM-2, and said surface active agent is aminopropyltriethoxysilane.

13. The mixed matrix membrane as recited in claim 1 further comprising a hollow fiber, wherein said zeolite, said surface active agent and said polyimide are disposed within said hollow fiber.

14. The mixed matrix membrane as recited in claim 13 wherein a longitudinal axis of said zeolite is parallel with a longitudinal axis of said hollow fiber.

15. The mixed matrix membrane as recited in claim 13 wherein said zeolite and said polyimide are in one or more defined longitudinal planes which are parallel to a longitudinal axis of said hollow fiber.

16. The mixed matrix membrane as recited in claim 15 wherein said zeolite is present as several defined segments.

17. The mixed matrix membrane as recited in claim 13 wherein said hollow fiber has a diameter ranging from 100 nm to 100 microns.

18. A mixed matrix membrane comprising:
zeolite;
a surface active agent adhered to said zeolite; and
polyimide,
said zeolite and said polyimide being bonded to each other by at least one of hydrogen, covalent, and ionic bonds between said surface agent on said zeolite and said polyimide;
wherein said zeolite and said polyimide are each present as multiple layers with layers of zeolite sandwiched between layers of polyimide.

19. The mixed matrix membrane as recited in claim 1 wherein an interface between said zeolite and said polyimide has voids no bigger than 100 nanometers.

20. The mixed matrix membrane as recited in claim 1 wherein an interface between said zeolite and said polyimide is substantially void free.

21. A method of making a mixed matrix membrane comprising the steps of:
functionalizing a zeolite to include first functional groups; wherein the functionalizing step includes heating a mixture comprising zeolite and toluene at a temperature in a range of 100° C. to 110° C.;
combining a polymer having second functional groups with said zeolite to form a mixture;
casting the mixture onto a support;
removing solvent from the mixture; and
annealing the mixture.

22. The method of claim 21 further comprising the step of functionalizing said polymer with said second functional groups.

23. The method of claim 22 wherein functionalizing the zeolite includes silanating polyelectrolytes onto the zeolite.

24. The method of claim 22 wherein functionalizing the zeolite includes introducing an amine group onto a surface of the zeolite.

25. A method of making a mixed matrix membrane comprising the steps of:
functionalizing a zeolite to include first functional groups; wherein the functionalizing includes silanating with aminopropyl-triethoxysilane (APTES)
combining a polymer having second functional groups with said zeolite to form a mixture;
casting the mixture onto a support;
removing solvent from the mixture; and
annealing the mixture.

* * * * *

UNITED STATES PATENT AND TRADEMARK OFFICE
CERTIFICATE OF CORRECTION

| | | |
|---|---|---|
| PATENT NO. | : 7,109,140 B2 | Page 1 of 1 |
| APPLICATION NO. | : 10/410599 | |
| DATED | : September 19, 2006 | |
| INVENTOR(S) | : Marand et al. | |

It is certified that error appears in the above-identified patent and that said Letters Patent is hereby corrected as shown below:

In column 1, under the title please add the following paragraph:
--This invention was made with government support under Contract Number CTS-9905549 by the National Science Foundation. The government has certain rights in this invention. --

Signed and Sealed this

Ninth Day of January, 2007

JON W. DUDAS
*Director of the United States Patent and Trademark Office*